Patented Apr. 15, 1941

2,238,149

UNITED STATES PATENT OFFICE 2,238,149

PROCESS FOR IMPROVING THE STABILITY OF HYGROSCOPIC SUBSTANCES

Emil Aeckerle, Ludwigshafen-on-the-Rhine, Germany

No Drawing. Application October 27, 1938, Serial No. 237,367. In Germany November 2, 1937

3 Claims. (Cl. 23—243)

It is well known that many substances cause difficulties when used in technics, and more particularly in the foodstuff industry, because of their hygroscopicity or sensitivity to moisture, since they attract moisture from the air, become lumpy, enter into reaction or deliquesce.

It is also known that attempts to meet this disadvantage have already been made in various ways, with more or less success. Thus, for example, common salt, in order to keep it dry, has been mixed with wholly or partly dehydrated phosphates, tartaric acid powder has been impregnated with paraffin, and, instead of hygroscopic citric acid containing water of crystallisation, the non-hydrated has been used, and so forth.

These expedients however could only dimish or delay the disadvantageous consequences of hygroscopicity; moreover, such substances always had to be protected by special moisture-tight packages, or cases, as well and for the handling of the same definite directions had to be given, departure from which led to difficulties.

It has now been found that dehydrated calcium citrate is very surprisingly suitable for removing the above-mentioned drawbacks. Whereas the action of the said chemicals heretofore usual which are poor in, or free from, water is of only short duration and ceases with the gradual absorption of the water of crystallisation, which is withdrawn from these substances, when even crystallisation phenomena may then arise within the salt mixtures concerned which lead to a particularly hard caking together, substances mixed with dehydrated calcium citrate behave fundamentally differently.

Accordingly, the process provided by the present invention consists in adding to water-attracting substances, or mixtures thereof, in powdered form suitable quantities of calcium citrate which is poor in, up to free from, water of crystallisation for the purpose, inter alia, of preventing agglomeration of said substances or mixtures thereof.

The mixtures prepared according to the process provided by the invention may be packed in normal fashion, and moreover special directions do not have to be observed when handling the same. Furthermore, even after a fairly long time no caking together occurs under the most unfavourable exterior conditions. Obviously a very specific property of the calcium citrate is involved here, which moreover, is not, as might have been expected, present to an approximately equal degree in the case of the other citric acid alkaline earth salts.

A further particularly valuable feature is the fact that the calcium salt of citric acid is a substance, the water solubility in the cold of which, relatively high for a calcium salt, enables it to be used according to the invention without precipitate formation of practical importance arising in the aqueous solution of preparations treated according to the invention, such as for example of a fruit salt.

Further the calcium citrate is the salt of an edible organic acid generally introduced into the edible product industry. The new process provides a considerable technical advance for all salt mixtures in powder or finely crystalline form usual in the foodstuff industry, such as common salt, fruit salt, baking powder, and so on, which advance expresses itself practically in a better stability of all preparations of this kind and in a substantial simplication and cheapening of the packing problem.

*Example 1*

A mixture of 93 grams of common salt and 7 grams of anhydrous calcium citrate is prepared. This mixture remains stable in air, that is to say it can be used in sprinklers on the table without its lumping together in any way or becoming moist.

*Example 2*

A so-called friut salt consisting of 43 grams of tartaric acid and 52 grams of sodium bicarbonate is mixed with 5 grams of dried calcium citrate. When using the mixture no precautions are necessary of always keeping the bottle closed in order to prevent reaction between the two constituents tartaric acid and bicarbonate.

*Example 3*

A baking powder consisting of 8.4 grams of acid sodium pyrophosphate and 6.0 grams of sodium bicarbonate is mixed with 5.6 grams of dehydrated calicum citrate and filled into the usual bags. The use of the heretofore usual maize starch or rice starch, which was to avoid a reaction between the components, is unnecessary or may be reduced to a fractional part.

*Example 4*

90 grams of ground coffee powder, or coffee powder substitute, with or without other additions, are mixed with 10 grams of dehydrated finely ground calcium citrate, and in this way acquire a sufficient protection in the usual marketable forms against the action of the moisture of the air.

Example 5

Mixtures of phosphates which are poorer in water of constitution than the orthophosphates with common salt and so forth, such as are used for making the blood of slaughtered animals uncoagulable, is given an addition of 15% of dehydrated calcium citrate in order to avoid any caking together during the storage.

Example 6

97 grams of citric acid containing water of crystallisation are treated with 3 grams of calcium oxide powder and the whole intimately mixed for a sufficient time with maintenance of a temperature of about 40°. The stability of the citric acid treated thus is considerably improved.

I am aware that pelleted compositions which evolve gas under the action of heat are known comprising solid gas-producing material, e. g. a mixture of ammonium chloride and sodium nitrite or tartaric acid and sodium or ammonium bicarbonate, in which in order to prevent premature evolution of gas even at ordinary temperature a small quantity of a stabiliser is incorporated consisting of a dehydrating agent which is inert in that it does not appreciably influence the quantity of gas evolved from the composition on heating, said stabiliser being an anhydrous substance capable of forming a hydrate which is stable at any temperature at which the pelleted composition is required to remain without decomposition, or a lower hydrate having a strong tendency to form a higher hydrate at any temperature at which the composition is required to remain without decomposition, examples of suitable stabilisers being anhydrous sodium carbonate and anhydrous sodium sulphate.

What I claim is:

1. A process for reducing the caking tendencies of hygroscopic, pulverulent compounds which absorb moisture and tend to cake when exposed to moist air, which comprises thoroughly mixing with such a compound finely-divided, substantially anhydrous calcium citrate in quantity sufficient to substantially reduce the caking tendency thereof.

2. The process of claim 1 wherein said material to be stabilized is crystalline citric acid.

3. The process of claim 1 wherein said material to be stabilized is crystalline citric acid and wherein stabilization is produced by the addition of a small amount of calcium oxide, resulting in the formation of said calcium citrate in situ.

EMIL AECKERLE.